Dec. 11, 1923.
B. NEWMAN
DEODORIZING APPARATUS
Filed Sept. 15, 1921
1,477,183
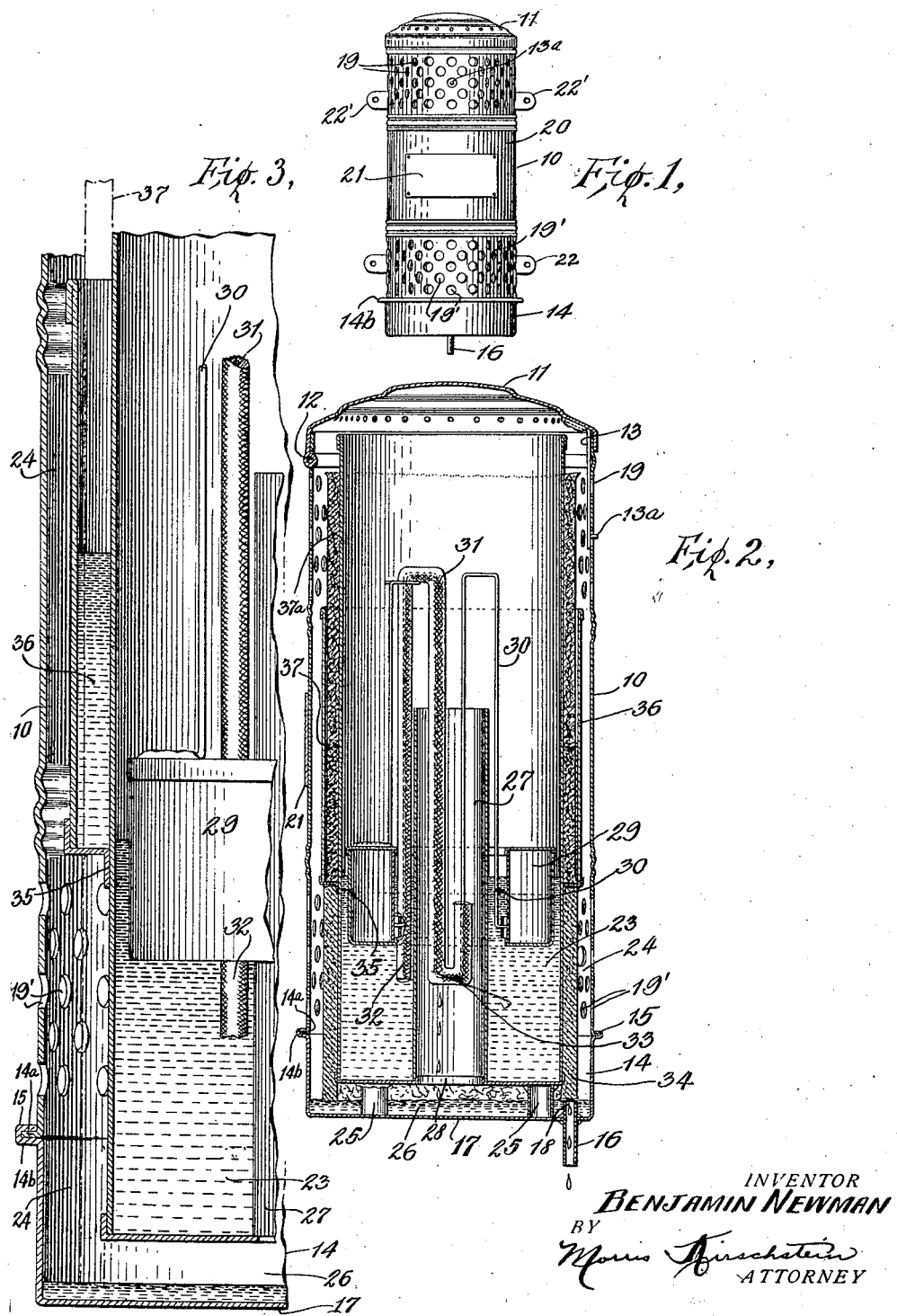
INVENTOR
BENJAMIN NEWMAN
BY
Morris Kirschstein
ATTORNEY Patented Dec. 11, 1923.

1,477,183

UNITED STATES PATENT OFFICE.

BENJAMIN NEWMAN, OF NEW YORK, N. Y.

DEODORIZING APPARATUS.

Application filed September 15, 1921. Serial No. 500,770.

*To all whom it may concern:*

Be it known that BENJAMIN NEWMAN, citizen of the United States, and resident of the city of New York, in the county of New York and State of New York, has invented certain new and useful Improvements in Deodorizing Apparatus, of which the following is a specification.

This invention relates to deodorizing and disinfecting apparatus.

One object thereof is to provide a device of the character described which shall in a high degree be sure and effective of operation.

Another object is to provide an apparatus of the character described which shall be neat and compact in construction and comparatively inexpensive to manufacture.

Other objects of this invention will in part be obvious and in part hereinafter pointed out.

The invention accordingly consists in the features of construction, combinations of elements and arrangment of parts which will be exemplified in the construction hereinafter described and of which the scope of application will be indicated in the following claims.

In the accompanying drawings, in which is shown one of the various possible illustrative embodiments of this invention, Fig. 1 is a front elevational view of an embodiment of this invention;

Fig. 2 is a longitudinal cross-section view thereof;

Fig. 3 is a partial longitudinal cross-sectional view similar to Fig. 2 and on a larger scale.

Referring more in detail to the drawing, the embodiment of the invention there shown is seen to comprise a cylindrical casing 10 preferably of thin metal finished to present a neat appearance and having a cover 11 hinged thereto as at 12. To releasably hold the cover 11 tightly in place on the casing a resilient strip 13 carrying a short projecting pin 13ª is attached to the interior of the cover, and adjacent to the interior wall of the casing 10. This pin 14 normally engages in one of the openings 19 in the upper portion of the casing. To lift the cover, the pin 14 is manually pushed in, out of engagement with the opening 19 as will be readily understood. The casing 10 is closed at the bottom by a cylindrical member 14 which is secured thereto in any suitable manner. In the embodiment shown in the drawing, the casing is formed at the bottom with an annular shoulder 14ª and the piece 14 is provided with an annular bead 14ᵇ, which is crimped over the shoulder as shown at 15 in Figures 2 and 3. This cylindrical member serves as a reservoir for the deodorizing fluid as hereinafter more fully described. A drip 16 extends from the bottom 17 of this member 14 and it projects thereinto as at 18, so that when the level of the liquid in the reservoir rises slightly above this portion 18 of the drip, the liquid drips through the latter to the source to be disinfected as will be readily understood. Spaced openings 19—19′ are provided respectively adjacent the upper and lower ends of the casing 10 to permit the diffusion of vapors from the deodorizing liquids. The intermediate unpierced portion 20 of the casing may serve for the attachment of a name plate 21 and the casing and contents as a unit is adapted for attachment to a surface by means such as bracket members 22—22′ extending therefrom.

From the foregoing description of the casing it will be apparent that the latter is divided into three portions comprising an upper and a lower deodorizing surface consisting respectively of the series of openings 19 and 19′, and an intermediate solid portion. The arrangement of the deodorizing wicks and reservoirs supplying these deodorizing surfaces will be now described.

A cylindrical container 23 for the deodorizing and disinfecting liquid is supported within the casing so as to provide an annular space 24. Legs 25 are provided on the bottom of this vessel 23, whereby on positioning the vessel in the casing, a space 26 remains between the bottom of the inner containing vessel 23, and the bottom 17 of the member 14. Vertically upstanding from the bottom of the vessel 23 and rigidly secured thereto by a water tight joint, is a tube 27, substantially longer than half the length of the vessel and centrally located therein. The bottom of the vessel 23 has a circular opening 28, corresponding to the inside diameter of the tube 27 and in registry therewith. This tube 27 as will be seen later, will serve as an outlet for the liquid in the containing vessel 23 into the reservoir 14. The feeding of the liquid into this reservoir is accomplished by an annular float 29 inserted within the containing vessel 23 and fitting loosely therein, so that it is free to move up and down with the surface of the disinfecting liquid. This annular float 29 has a hollow annular opening of large enough diameter to freely move over the tube 27 and carry a wick 31, for raising the fluid surrounding the tube and to feed it slowly and regularly to the reservoir 14 through the outlet tube 27. A wire wick frame 30 preferably bent into the shape shown in Fig. 2, is attached to a float and carries the wick 31, one end of which 32, dips into the liquid in the annular space between the tube 27 and the float 29. The other end 33 fits freely into the tube 27. The liquid is thus drawn by capillary attraction up the wick and drips into the outlet tube 27, and thence into the reservoir 14.

A cylindrical wick 34 is placed on the surface of the container 23 and extends upwards beyond the perforations 19', and slightly below the bottom of the container 23, so that it dips into the reservoir 14. By capillary attraction the wick is thus constantly kept moist with the liquid and the circulating air vaporizes the liquid and diffuses the deodorizing vapors through the openings 19' in to the surrounding atmosphere. When the level of the liquid in the reservoir 14 is above the upper open end of the upper extending portion 18 of the drip 16, the liquid overflows through it and is thus led to the odoriferous source to be disinfected.

Secured to the container 23, adjacent to the upper edge of the wick 34 by suitable means effecting a water tight joint as at 35, is an auxiliary container 36 of such dimensions as to contain a sufficient supply of deodorizing liquid and to permit an auxiliary deodorizing wick 37 surrounding the container 23 to dip into said auxiliary container. This container 36 is filled by lifting the cover and pouring the liquid thereinto. The wick 37 extends beyond the auxiliary container so that the portion 37ª thereof is located opposite the upper series of openings 19 wherethrough the deodorizing vapors diffuse in the manner already described in reference to the lower wick 34.

It will be noted that substantially the entire surface of the inner container is utilized for deodorizing purposes and that the deodorization is accomplished through two independent sources, namely the lower wick 34 which is located opposite the series of openings 19' and draws its liquid from the reservoir 14 which obtains its supply from the inner container by means of the float apparatus; and the upper wick 37 which dips into the auxiliary container 36. The liquid in the latter can only be used through evaporation and consequently the same need not be replenished except at very long intervals. So that if the liquid in the inner container which functions both as a disinfectant and deodorizer should through the double process of evaporation and dripping be exhausted the second deodorizing source would ordinarily continue to operate. In this way, the apparatus insures positive and efficient deodorization.

It will be noted that the inner removable container 23 conveniently serves for both the means for containing deodorizing and disinfecting liquid and as the support for the wicks.

It will thus be seen that there is provided apparatus in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:—

A combined deodorizing and disinfectant device comprising a casing having a series of openings in the upper and lower portions thereof, a container supported within said casing spaced from the bottom and sides thereof, said container formed with a central upwardly extending tubular member open at both ends, an auxiliary container surrounding said first mentioned container above the bottom of the casing, a wick disposed about the lower portion of said container and depending below the bottom thereof, another wick disposed within said auxiliary container and extending above the top thereof, said wicks being disposed opposite the upper and lower series of openings, respectively, a float adapted to rest on the liquid in the container and carrying a wick extending from said float into the upwardly extending tube, and means permitting the gradual discharge of the fluid from the casing.

Signed at New York city, in the county of New York and State of New York, this 12th day of September, 1921.

BENJAMIN NEWMAN.